United States Patent [19]

Chelminski

[11] Patent Number: 4,858,718

[45] Date of Patent: Aug. 22, 1989

[54] TUBE-WAVE ATTENUATION METHOD, SYSTEM AND APPARATUS FOR USE WITH AN INPULSIVE SEISMIC ENERGY SOURCE IN LIQUID-CONTAINING WELLS

[75] Inventor: Stephen V. Chelminski, West Redding, Conn.

[73] Assignee: Bolt Technology Corporation, Norwalk, Conn.

[21] Appl. No.: 38,327

[22] Filed: Apr. 14, 1987

Related U.S. Application Data

[63] Continuation-in-part of Ser. No. 23,208, Mar. 9, 1987.

[51] Int. Cl.$^4$ .............................................. G01V 1/40
[52] U.S. Cl. .................................... 181/106; 367/176; 367/911
[58] Field of Search .............................. 181/102–106, 181/108, 110–113, 115, 117–120, 175, 233, 235, 264, 269, 271, 272, 401; 367/25, 144, 146, 162, 911, 912

[56] References Cited

U.S. PATENT DOCUMENTS

| | | | |
|---|---|---|---|
| 3,054,471 | 9/1962 | Knudsen | 181/108 |
| 3,126,976 | 3/1964 | Cordell et al. | 181/175 |
| 3,601,216 | 8/1971 | Mott-Smith | 181/115 |
| 3,718,205 | 2/1973 | Fair et al. | 181/119 |
| 3,982,606 | 9/1976 | Berry et al. | 181/102 |
| 3,997,021 | 12/1976 | Chelminski | 181/106 |
| 4,234,052 | 11/1980 | Chelminski | 181/120 |
| 4,472,794 | 9/1984 | Chelminski | 367/144 |
| 4,497,388 | 2/1985 | Dexter | 181/269 X |
| 4,611,685 | 9/1986 | Curran | 181/102 |
| 4,671,379 | 6/1987 | Kennedy et al. | 367/25 X |
| 4,722,417 | 2/1988 | Selsam | 181/119 |
| 4,739,857 | 4/1988 | Airhart | 181/113 |
| 4,744,438 | 5/1988 | Ruzie et al. | 181/102 |

Primary Examiner—Brian S. Steinberger
Attorney, Agent, or Firm—Parmelee, Bollinger & Bramblett

[57] ABSTRACT

An inflatable attenuator having an inflatable resilient bladder enclosed by a perforated protective cylindrical housing is positioned in a liquid column in a well below (and if desired another inflatable attenuator is also positioned above) an impulsive energy source in the liquid column. The housing has an exterior diameter slightly less than the interior diameter of the well. The bladder is inflated when in the liquid column by gas supplied from a pressurized gas container attached to the attenuator or is supplied with pressurized gas through a hose line from a source of pressurized gas located on the surface of the Earth near the mouth of the well. A pressure-regulator responsive to the ambient hydrostatic pressure in the liquid column near the pressure regulator serves to maintain the pressure of the gas within the bladder at a regulated pressure at least equal to the ambient pressure in the liquid column where it is located. A pressure-relief valve releases pressurized gas from the bladder to prevent the pressure inside of the bladder from exceeding a predetermined differential in pressure between the inside of the bladder and ambient hydrostatic pressure so that the bladder will not rupture when the attenuator is being elevated in the well. The inflated bladder attenuates tube waves traveling along the liquid column in the well from an impulsive source of seismic energy waves when employed in the liquid column above or below the energy source. The upwardly traveling tube waves may alternatively be dissipated by releasing numerous gas bubbles in the upper portion of the liquid column to generate a bubble barrier in the upper portion of the liquid column. A further embodiment includes two bladders, including a tapered upper bladder which flares outwardly and downwardly and a cylindrical lower bladder. The perforated protective housing is omitted, and enlarged annular shoulders protect these bladders from abrasion against the wall of the well.

31 Claims, 8 Drawing Sheets

TUBE-WAVE ATTENUATION METHOD, SYSTEM AND APPARATUS FOR USE WITH AN INPULSIVE SEISMIC ENERGY SOURCE IN LIQUID-CONTAINING WELLS

This application is a continuation-in-part of Ser. No. 07/023,208, which is now abandoned.

BACKGROUND

The present invention relates to seismic exploration of the structure of the Earth Surrounding liquid-containing wells, and more particularly to the type of exploration wherein powerful acoustical impulses are produced by a sound source lowered into the liquid in a well for causing acoustical impulses to penetrate the wall of the well adjacent to the sound source and to travel through the surrounding structure to geophones for recording and analyzing the resulting electrical signals produced by the respective geophones in response to the acoustical impulses reaching them after propogation through the Earth's structure.

A problem which is encountered in such seismic exploration results from the fact that the liquid-filled well bore is a good conductor of tube waves with the inner surfaces of the well wall acting as a wave guide. Thus, relatively strong tube waves travel along the well bore downwardly and upwardly from the sound source each time that it is fired. When these tube waves travelling down along the well bore reach the bottom of the well, or a discontinuity in the liquid-filled well bore, they are strongly reflected, but a significant amount of the energy in these tube waves becomes converted into compressional body waves propogating out from the discontinuities in the well through the surrounding structure of the Earth. Similarly, when these tube waves traveling up along the liquid-filled bore reach the top surface of the liquid, they are strongly reflected, but a significant amount of their energy becomes converted into compressional body waves propagating out from the top of the liquid column through the surrounding structure of the Earth.

These compressional body waves, i.e., sound (accoustical) waves, propagated outwardly through the Earth's structure from the bottom and top of the liquid column and other discontinuities within the well bore, may be called "secondary sound (or acoustical) waves", and they also reach the geophones but at a later time than did the compressional body waves travelling directly from the impulse energy (sound) source. Shear waves travelling directly from the impulsive energy source are propagated more slowly than compressional body waves, about half as fast, and thus the secondary sound waves cause more interference with the shear waves than with the compressional body waves. These secondary sound waves cause the records of signals from the geophones to be cluttered and confusing with unwanted signals which are attempted to be removed during processing of the records before their final graphic display.

The tube waves which travel downwardly or upwardly from the sound source along the liquid-filled well bore are being guided along the side wall of the well bore, and the particle motions of these tube waves occur in both the well liquid and the adjacent solid material of the casing or rock and are in the nature of "Stoneley Waves".

SUMMARY

It is an object of this invention to provide a tube wave attenuation method, system and apparatus for use with a sound source lowered into the liquid in a wall for attenuating tube waves travelling from the sound source downwardly or upwardly along the liquid column.

In carrying out this invention in one illustrative embodiment thereof, a method is provided for attenuating unwanted tube waves in a liquid column in a well comprising the steps of lowering an inflatable attenuator into the liquid column in the well and supplying pressurized gas to the inflatable attenuator. The supply of pressurized gas to the attenuator is regulated to be at least equal the ambient pressure in the liquid column near the attenuator in the well. An impulsive energy source is lowered in the liquid column in the well above the inflatable attenuator to be fired for seismic exploration purposes. The tube waves travelling down along the liquid column are attenuated by the attenuator prior to reaching the bottom of the well in order to prevent or minimize secondary acoustical waves from emanating from discontinuities in the well and from the bottom of the well, which would otherwise be caused as a result of the tube waves travelling down the column of liquid in the well.

An attenuator may also be provided above the energy source for attenuating tube waves travelling upwardly from the source along the column to prevent secondary waves from being propagated out from discontinuities in the well and from the top of the liquid column. Upper attenuation may also be obtained by creating gas bubbles in the upper portion of the liquid column. Such bubbles may be provided from a separate source or from the source supplying pressurized gas to the inflatable attenuator. In addition, pressurized gas may be released from the inflatable attenuator into the liquid column to prevent the internal pressure of the inflatable attenuator from exceeding a predetermined differential relative to ambient liquid pressure for preventing damage to the inflatable attenuator when it is raised from a lower to a higher elevation in the well.

Advantageously, the tube-wave attenuator apparatus, system and method of the present invention effectively dissipate tube waves emanating from an energy source fired in the well, which travel either upwardly or downwardly along a column of liquid in a well for preventing or minimizing the resulting interference or confusion with respect to the desired compressional and shear waves travelling directly into the Earth's structure from the sound source for reaching geophones located in other wells or elsewhere around the first well. The present apparatus system and method eliminate or minimize the resulting secondary signals for alleviating the confusion problems discussed above.

BRIEF DESCRIPTION OF THE DRAWINGS

The invention together with further objects, aspects, features and advantages will be more clearly understood from the following description taken in connection with the accompanying drawings in which the same reference numerals are used to identify the same elements throughout the various views.

DESCRIPTION OF THE PREFERRED EMBODIMENTS

Figure 1:
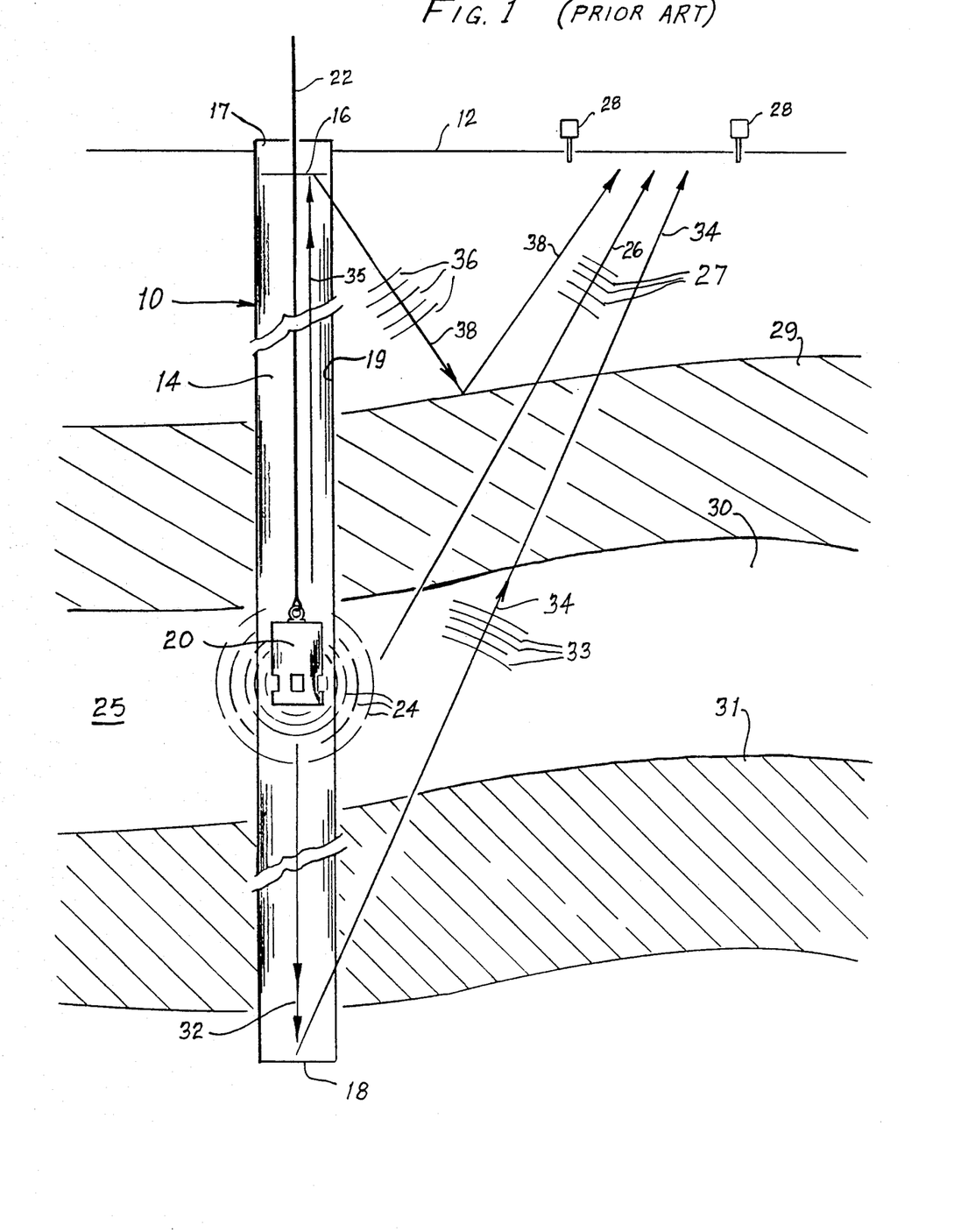
FIG. 1 is a diagrammatic illustration of the prior art problems showing the undesired effects of tubes waves caused by a sound source lowered and fired in a well containing a liquid column with geophones located nearby, and showing the paths of the resultant secondary waves emanating from the bottom of the well and also from the top of the liquid column in the well.

Referring now to FIG. 1, which in effect is used to describe the prior art problem, a well 10 which has been drilled in the Earth 12 contains a column of liquid 14 having a top surface 16 and a bottom surface 18 at the lower end of the well. This well has a mouth 17 and it may or may not include a casing or liner of steel 19. The invention is applicable in either case. An impulsive energy source 20 for example, a marine seismic airgun such as shown in my U.S. Pat. Nos. 3,997,021 and 4,472,794 and/or a hydro gun such as shown in my U.S. Pat. No. 4,234,052 is suspended from a cable or line 22. This sound energy source is illustrated as being fired which generates seismic waves 24, including compressional body waves and shear waves, which emanate in all directions from the energy source 20 and penetrate the wall of the well 10 to travel through the surrounding Earth structure 25 as illustrated by the path arrow 26 leading to geophones 28 on the surface of the Earth 12 for recording and analyzing the resulting electrical signals produced by the geophones in response to the acoustical impulses 26 reaching them after propagation through the Earth's structure 25.

It is to be noted that the geophones 28 may be positioned on the Earth's surface surrounding the well mouth and/or may be positioned below the surface of the Earth, for example, in other holes or wells; or they may be positioned on the Earth at a different or considerably lower elevation, for example, on the flank of a nearby valley. The geophones 28 may also be positioned in other liquid-containing wells which are located reasonably near to the well 10, in which event the geophones 28 are adapted to be submerged and then may be structured as hydrophones. The waves 24 propagated directly from the source 20 via a path indicated by the arrow 26 are the desired primary waves 27 reaching the geophones or hydrophones 28. It will be understood that these primary waves 27 may have been reflected and/or refracted by the various geological formations 29, 30 and 31 in the vicinity of the well 10 before these desired primary waves reach the geophones or hydrophones 28. Thus, the path 26 (or multiple paths) travelled by these primary waves in reaching each phone 28 is usually not straight. The waves 27 are considered to be "primary waves", because they originated directly from the energy source 20, and they include compressional body waves and the slower-travelling shear waves. The arrow 26 is shown straight for convenience and clarity of explanation.

Since the liquid column 14 acts with the well wall as a good conductor of tube waves and the well bore acts as a wave guide, strong tube waves illustrated by the arrow 32 are propagated toward the bottom of the well 10 and reflect off from the bottom 18 generating what are referred to as secondary sound waves 33 emanating from the well bottom 18 as illustrated by the arrow 34. Strong tube waves also travel upwardly from the source 20 along the liquid column as illustrated by the arrow 35 to the top of the liquid column 14 and are reflected back downwardly, but during this reflection a substantial amount of compressional body waves (sound or acoustical waves) emanate from the top surface 16 and travel outwardly and downwardly as secondary waves 36 as illustrated by the arrow path 38. Such secondary waves are reflected or refracted by one or more formations 29 in the Earth 12 and reach the phones 28. These secondary waves 33 and 36 represent significant amounts of acoustical energy which reach the phones in addition to and at different moments from the primary sound waves 27. Therefore, these secondary sound waves 33 and 36 cause the signals recorded by the phones to become cluttered and confused with unwanted signals which must be removed during processing of the records before the final graphic display relating to the Earth's structure 25 can be made. This removal or compensation for unwanted signals is a difficult and time-consuming process and is not easy to accomplish and may only be accomplished partially. Accordingly, the present invention is directed to attenuating the tube waves 32 and 35 in the liquid column 14 before they reach the bottom 18 or top 16 of the liquid column, and preferably to attenuating the tube waves relatively near to the energy source 20.

Figure 2:
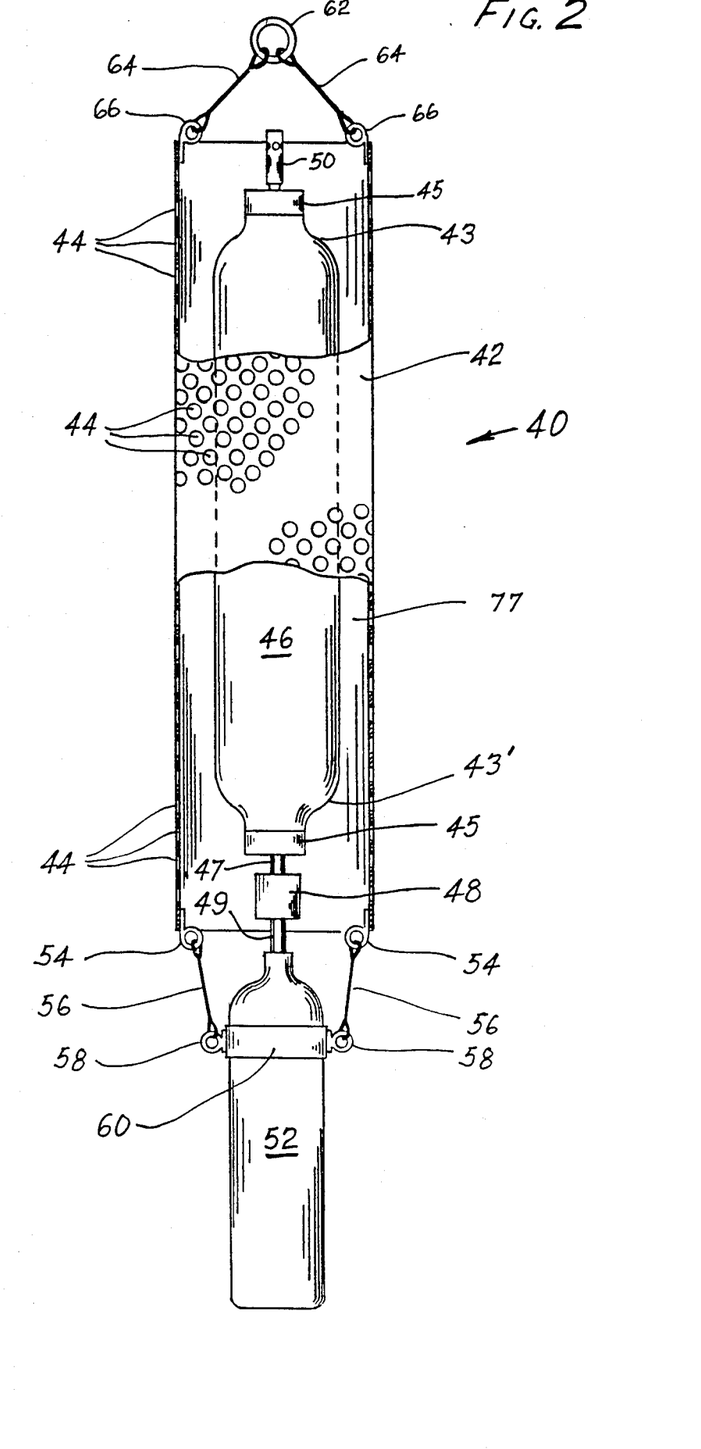
FIG. 2 illustrates an inflatable attenuator embodying the present invention in certain aspects of the invention.

FIG. 2 shows an inflatable attenuator, referred to generally with the reference numeral 40 which comprises a circular cylindrical steel housing or casing 42 which has an external diameter slightly less than the inside diameter of the well 10 and is perforated over its entire length with apertures or openings 44. The perforated cylindrical housing 42 encircles an inflatable bladder 46 of suitable material, such as rubber or a polymeric expandable material, for example, an elastomeric material e.g neophrene rubber, nitrile rubber, silicone rubber, polyurethane reinforced with strong fibers for example, fibers of polyester or Kevlar, and having bladder-end terminating fittings 45 at each reduced-diameter end. The resilient wall of the bladder 46 flares or tapers downwardly and outwardly as indicated at 43 immediately below the reduced-diameter upper end fitting 45. Similarly, at the lower end of the bladder 46 there is an upward and outward flare or taper of the bladder wall immediately above the lower end reduced-diameter fitting 45, as indicated at 43'. The bladder 46 is connected by a conduit 47 to a pressure-reducing and regulating valve 48 which is responsive to ambient pressure for maintaining the pressure within he inflatable bladder 46 slightly above the ambient pressure of the liquid in the well at the level to which the inflatable attenuator 40 is lowered. This pressure-reducing valve 48 is connected by a conduit 49 to a pressurized gas supply container 52. Thus, the bladder 46 is held in position within the housing 42 by its attachment via conduit 47 to the container 52. The inflatable bladder 46 carries a relief valve 50 which is responsive to the differential in pressure between the ambient liquid in the well and the pressure inside of the inflatable bladder 46.

The purpose of the valves 48 and 50 is to enable the supplying of pressurized gas into the interior of the bladder 46 as the inflatable attenuator 40 is being lowered in a well to keep the internal pressure in the bladder 46 at a pressure level somewhat above the ambient liquid pressure, for example, in the range from about 1 pound per square inch (p.s.i.) to about 8 p.s.i. above the ambient and thus to keep the bladder inflated on its way down while bleeding off pressure through the relief valve 50 when the inflatable attenuator 40 is being elevated in the well, so that the bladder will not rupture or burst from too much differential of inside-to-outside pressure on the way up in the well. For example, the relief valve 50 may be set to bleed open whenever the inside bladder pressure is 12 p.s.i. or more above ambient pressure If the pressure-reducing and regulating valve 48 is self-venting, the relief valve 50 may be omitted.

Figure 3:
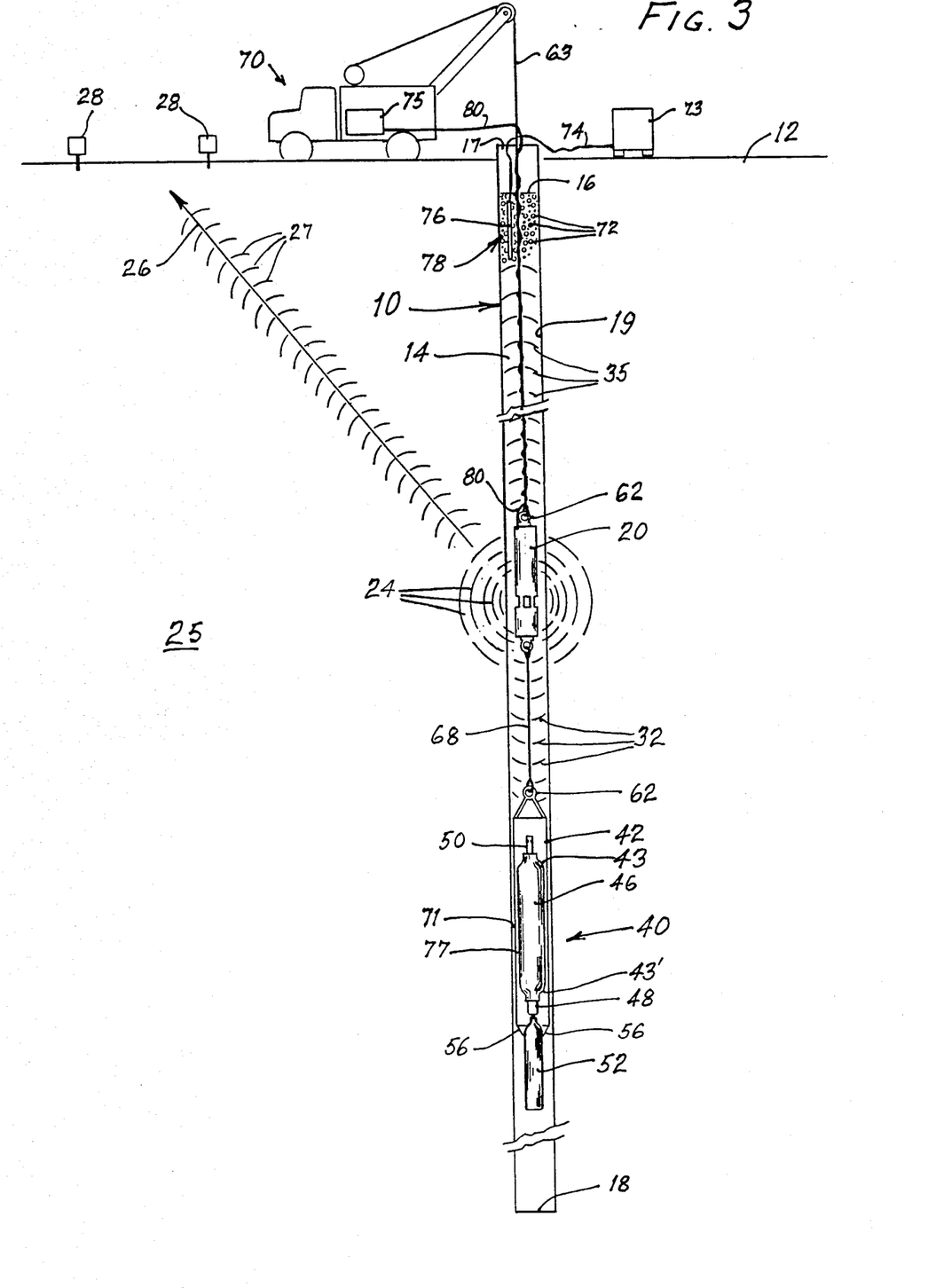
FIG. 3 illustrates one embodiment of the method and system of the present invention utilizing the inflatable attenutor of FIG. 2 in a well containing a liquid column with the attenuator positioned below an impulsive energy source used for seismic exploration.

The container 52 preferably of steel, containing compressed gas, usually air, is attached to the housing 42 by eyelets 54, cables or chains 56 and eyes 58 on a ring clamp 60 mounted on the container 52. Compressed gas from the container 52 is supplied through the pressure-reducing valve 48 to the bladder 46. The housing 42 is suspended from a hoisting ring 62 which is adapted to be attached to a lowering hoist cable 63 (FIG. 3). The ring 62 is attached by cables or chains 64 to eyelets 66 mounted in the top of the casing 42. When an inflatable attenuator 40 has a pressurized gas supply container 52 attached thereto as shown in FIG. 2, the inflatable attenuator may be considered a self-supplied or locally supplied unit. The attenuator 40 may also be supplied from a remotely located source 75 of pressurized gas, as explained later.

FIG. 3 illustrates one application of the inflatable attenuator 40 in the method and system of the present invention. A seismic exploration van or truck 70 carrying a high-pressure compressor 75 lowers via cable 63 the impulsive energy source 20 which has suspended from the lower end thereof on a cable 68 the inflatable attenuator 40 which is positioned below the energy source 20 in the well 10. High pressure gas, usually air, is fed from the pressurized gas source 75 via a high pressure hose line 80 to the energy source 20. When the impulsive energy source 20 is a hydro gun as disclosed and claimed in U.S. Pat. No. 4,234,052, then there is a positive displacement high pressure water pump carried by the van 70 for charging the impulsive energy source. When the impulsive energy source is fired generating the seismic impulses 24, the primary sound waves 27 are propagated through the structure 25 of the Earth 12, as shown by the arrow 26, and reach the geophones or hydrophones 28 which receive these desired primary waves. The tube waves 32 travelling downwardly in the column of liquid 14 in the well 10 encounter the inflatable attenuator 40 which provides very poor sound coupling between the liquid 14 and the air-filled bladder 46. When the tube waves 32 encounter the tapered upper end 43 of the inflated bladder 46 they are absorbed and damped by the elongated bladder for there is a relatively long path in the axial direction relative to the attenuator 40. Little tube wave energy will succeed in getting past the attenuator 40 because of the surrounding well wall and the narrow annular clearance 71 between the well wall and the perforated housing 42. It is to be understood that the inflated bladder 46 (FIG. 2) essentially completely fills the perforated housing 46 and the wall of the bladder 46 is pressing radially outwardly being preferably spaced about ⅛th to about ½ of an inch from the inside surface of the perforated cylindrical housing 42. The openings or perforations 44 in the housing communicate with the inflatable bladder 46 which dissipates and attenuates or damps tube waves 32 in the narrow region 71 around the attenuator 40 and in the narrow annular region 77 (FIG. 2) between the bladder 46 and housing 42. The openings 44 have a size of about 3/16ths to about 5/16ths of an inch and comprise at least about 40% to about 60% of the total area of the housing 42.

In the embodiment shown in FIG. 3, the tube waves 35 travelling to the top 16 of the liquid column 14 are attenuated using numerous bubbles 72 of air created by a low-pressure compressed air generator 73 feeding through a hose line 74 to an elongated porous probe 76 which discharges multitudes of compressed air bubbles 72 into the upper portion of the liquid column 14 creating a substantial column 78 of bubbles of various sizes and random spacing which dissipate the tube waves 35. Accordingly, tube waves 35 travelling upwardly in the liquid column are attenuated by bubbles 72 while tube waves 32 travelling downardly in the liquid column 14 are attenuated by the inflatable attenuator 40 allowing the phones 28 to receive only or mainly those desired primary waves 27 which are transmitted directly from the seismic energy source 20.

In the method and system of FIG. 3 the tube wave attenuator 40 is supplied with pressurized gas from the closely associated gas supply container 52. In the method and system of FIG. 4 now to be described, the tube wave attenuator 40 is supplied with pressurized gas from a source 75 on the Earth's surface 12.

Figure 4:
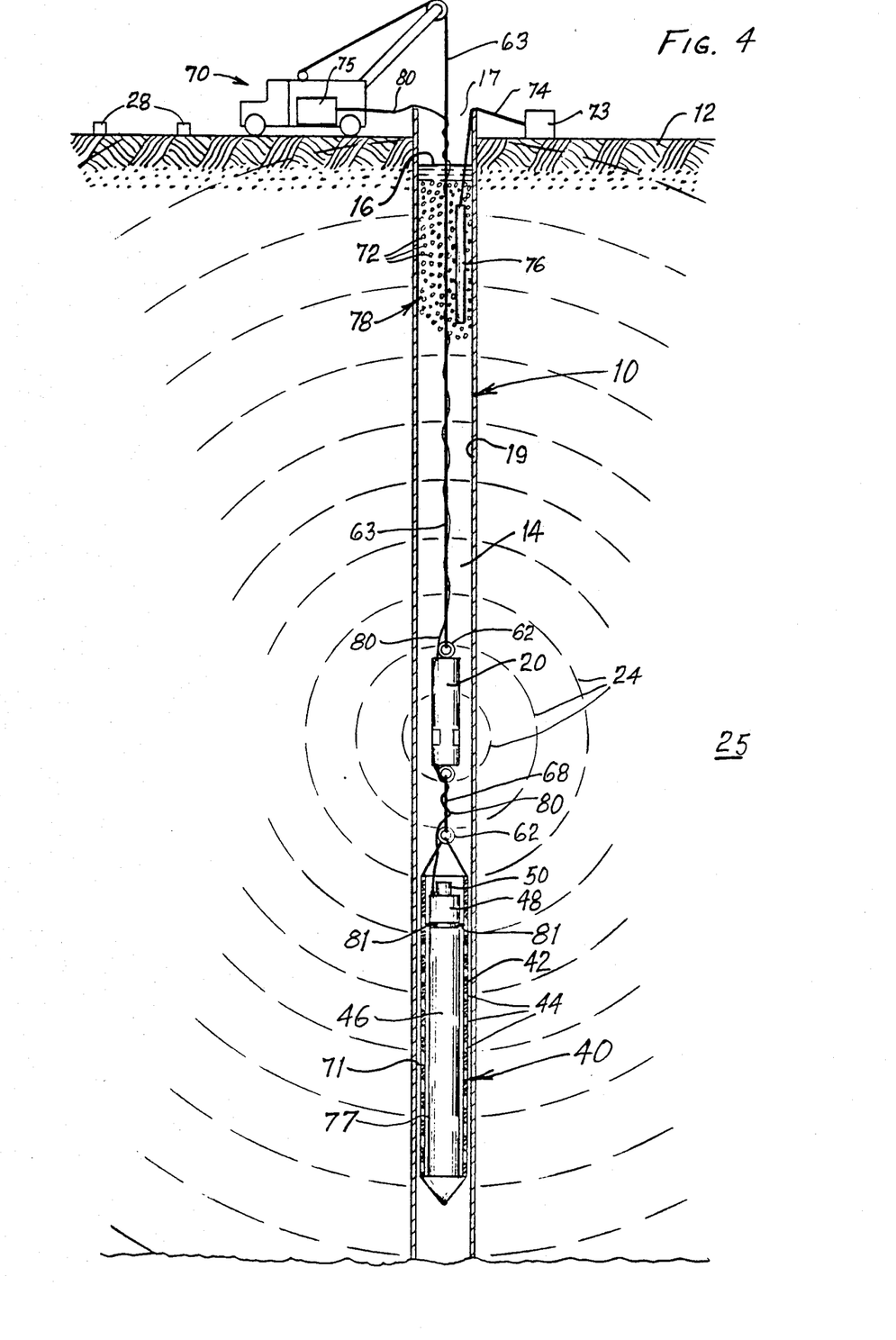
FIG. 4 shows an embodiment similar to FIG. 3 using a common gas supply near the mouth of the well for supplying both the impulsive energy source as well as the inflatable attenuator.

The embodiment in FIG. 4 is similar to FIG. 3 except that high-pressure compressed gas, usually air; is supplied from the surface by a high-pressure hose line 80 extending to the energy source 20 and to the inflatable attenuator 40, thereby dispensing with the need for attaching the supply container 52 of compressed gas to the inflatable attenuator 40. Accordingly, a common source 75 of compressed air in the van is supplying both the impulsive energy source 20 and the inflatable attenuator 40 via hose line 80. In addition, if desired, this same source 75 may be used to supply the probe 76 to create a mass of air bubbles 78 near the top 16 of the column for attenuating upwardly traveling tube waves in that bubble mass 78. Alternatively, the separate single-stage low-pressure compressor 73 can be used to feed the probe 76. The compressor 75 is a high-pressure compressor, for example at least a triple-stage compressor having an output pressure of at least 2,200 psi. The hose line 80 is connected through the pressure-reducing valve 48 to feed the interior of the bladder 46. The operation of the system in FIG. 4 and the method employed are the same as that shown in FIG. 3.

Figure 5:
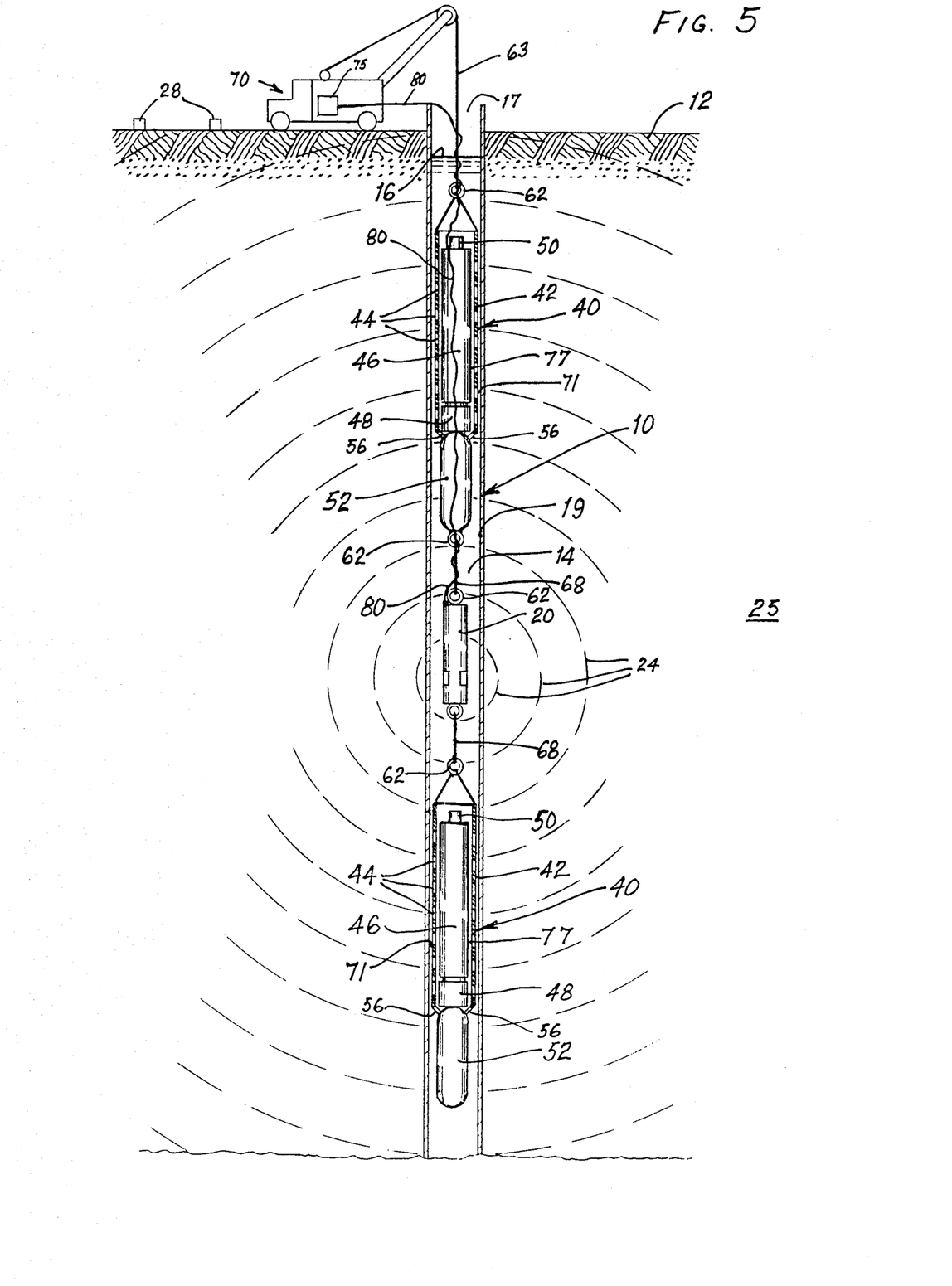
FIG. 5 illustrates another embodiment of the method and system of the present invention using two inflatable attenuators, one above and one below the impulsive energy source in the well.

FIG. 5 shows another embodiment of the method and system employing the use of an inflatable attenuator 40 both below as well as above the impulsive energy source 20. These two inflatable attenuators 40 are utilized to attenuate tube waves traveling down the liquid column 14 in the well 10 and to attenuate tube waves traveling upwardly in the liquid column from the energy source 20. In the embodiment of FIG. 5 the compressed gas source 75 is shown mounted in the seismic exploration van 70. Compressed gas is fed through the line 80 to the seismic energy source 20. It is to be noted in FIG. 5 that each of the tube wave attenuators 40 has an associated nearby container 52 of compressed gas, usually air, for inflating the bladder through a pressure-regulating valve 48.

Figure 6:
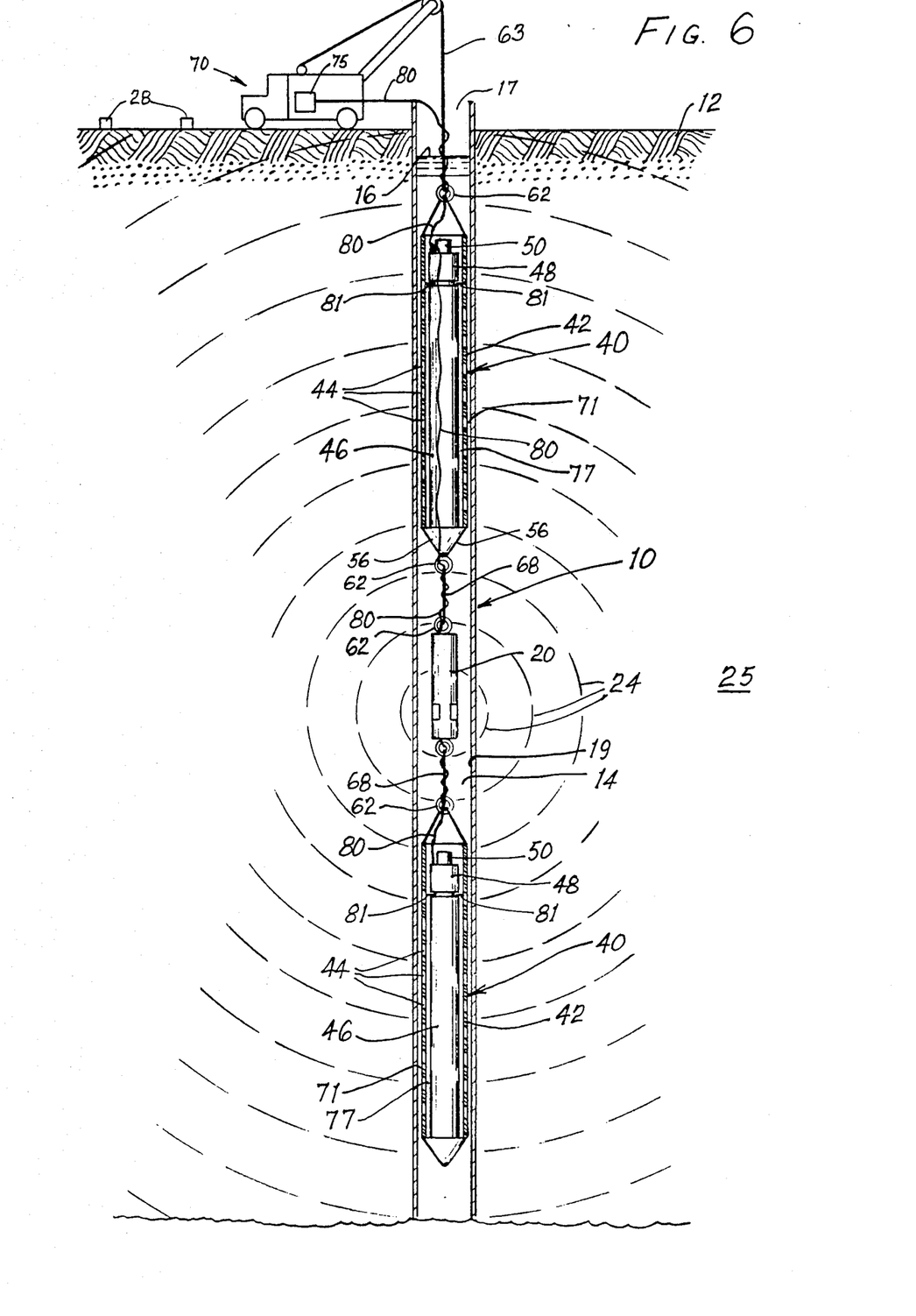
FIG. 6 illustrates another embodiment similar to FIG. 5 in which both inflatable attenuators as well as the impulsive source are fed from a single pressurized gas supply line.

FIG. 6 illustrates an alternative embodiment to FIG. 5 which utilizes a common pressurized gas supply 75 which feeds through a high pressure hose line 80 to the pressure-regulating valve 48 for inflatable bladder 46 of the upper attenuator 40. This hose line 80 also feeds to the energy source 20 and through a continuation of line 80 to the pressure-regulating valve 48 for the inflatable bladder 46 of the lower attenuator 40. The operation of the system and method of FIG. 6 are similar to those of FIG. 5 in that the upper attenuator 40 is used to attenuate upwardly traveling tube waves in the liquid column 14 while the lower attenuator 40 is used to attenuate tube waves traveling downwardly in this liquid column 14.

An advantage of using a single gas supply line 80 for feeding the energy source 20 and the attenuators 40 as shown in FIG. 6 resides in the ability to carry on very numerous firings of the seismic source 20 at various elevations without withdrawing the equipment from the well, which would become necessary if the pressurized gas in one of the containers 52 (FIG. 5) were to become dissipated during the seismic surveying operations and thus need to be replenished.

Accordingly, method and system apparatus have been provided which effectively attenuate tube waves which are traveling up and down in a column of liquid in a well which would otherwise interfere with or confuse the seismic survey. By attenuating or eliminating these troublesome tube waves which add no useful information, more accurate and more informative seismic surveys are enabled to be made.

The "pressurized gas" for charging the impulsive energy source 20 and for generating the bubbles 72 is usually compressed air. In situations where it is desired to avoid usage of compressed air, for example because of the hazard of combustible gases or liquids in the well 10 or for other reasons to avoid an oxidizing gas, then the pressurized gas may be compressed nitrogen or carbon dioxide. Also, steam may be used to charge the energy source 20, and then a low-pressure compressor 73 is used to generate the gas bubbles 72.

Inviting attention back to FIG. 2, it is to be noted that the container 52 of pressurized gas can advantageously be mounted inside of the bladder 46 by employing a container 52 which has a slim shape for providing an annular clearance space between the exterior of the pressure vessel 52 and the inside surface of the resilient, flexible wall of the bladder. Thus, the bladder remains resilient even though it houses the pressure vessel 52. By virtue of placing the pressure vessel 52 inside of the bladder 46, less compressed air is needed for inflating a bladder of given size, and the overall length of the inflatable attenuator 40 and its supply source 52 is reduced. The compressed air or other gas in the pressure vessel 52 will last longer, because there is considerably less free space in the bladder to be inflated.

In order to mount the pressure vessel 52 within the bladder 46, the cables or chains 56 are attached to pad eyes (not shown) attached to the lower end fitting 45. Then, the conduit 49 from the pressure vessel 52 extends down through the lower end fitting 45 and extends down to the pressure regulating valve 48, which is located below the lower end fitting 45. The exposed portion of the conduit 49 includes an accessible Tee coupling with a shut off valve (not shown) for enabling the pressure vessel to be conveniently refilled with pressurized gas whenever needed without removing the pressure vessel from inside of the bladder.

Figure 7A:
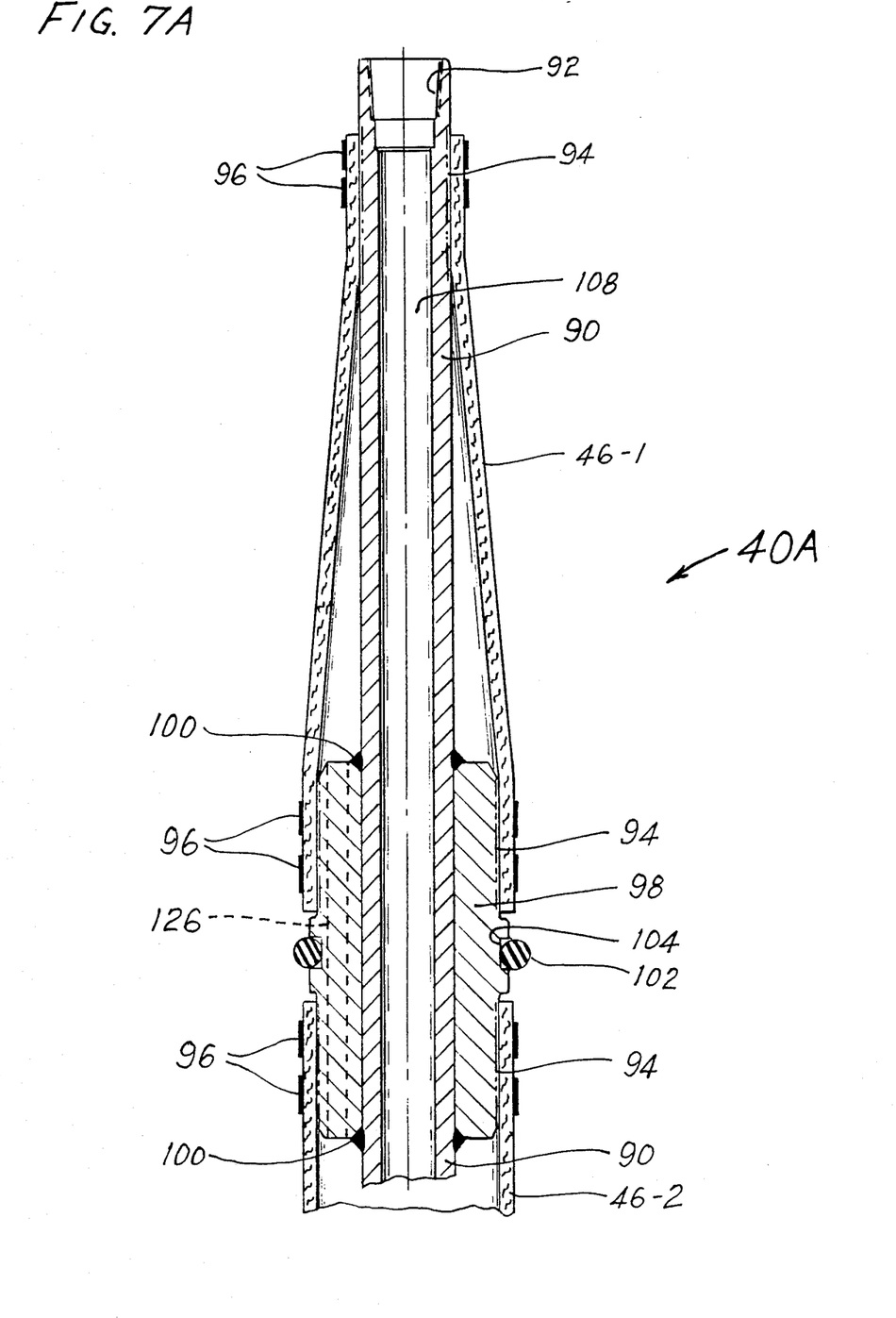
FIG. 7A shows the upper portions of another embodiment of an inflatable attenuator embodying the present invention in certain aspects of the invention.
Figure 7B:
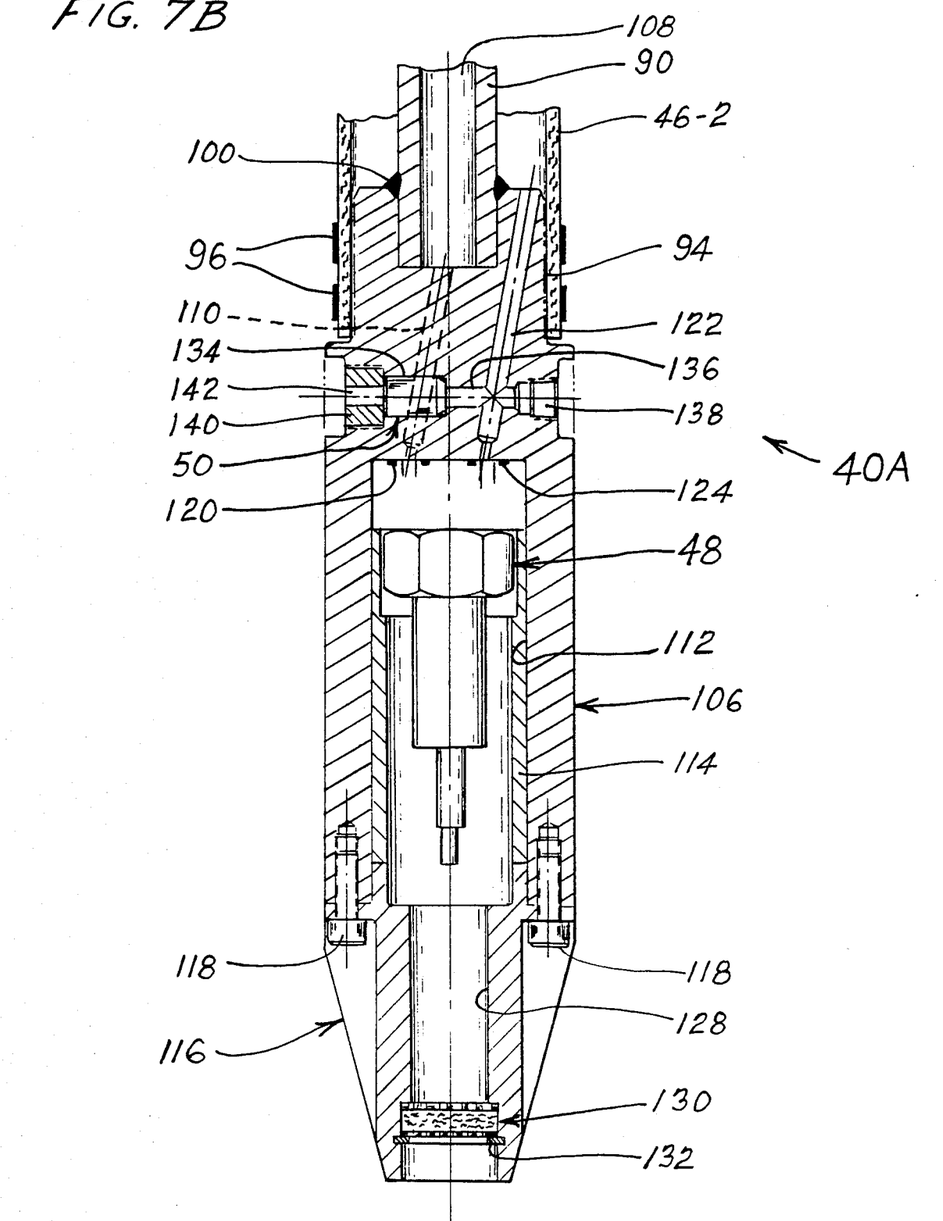
FIG. 7B shows the lower portions of the inflatable attenuator of FIG. 7A.

FIGS. 7A and 7B show an inflatable attenuator 40A having a cylindrical inflatable lower bladder 46-2 and an upper inflatable bladder 46-1. The cylindrical lower bladder 46-2 is made of the same material as the generally cylindrical bladder 46 in FIG. 2. At the present time, tough, durable, resilient non-reinforced polyurethane is the preferred material for the tapered upper bladder, 46-1 because it is desirable to position the attenuator 40 or 40A relatively close to the energy source for attenuating the tube waves as reasonably close to the energy source as practicable. Therefore, the upper bladder 46-1 becomes subjected to a powerful, impulsive change in pressure each time that the energy source is fired. Tough, durable, resilient polyurethane proves to be able to withstand successfully the resultant sudden large stresses involved. The upper bladder 46-1 tapers or flares outwardly and downwardly, for example, it has a relatively elongated generally conical configuration.

The support and axial trunk of this attenuator 40A comprises a strong rigid tube 90, for example, of steel, having a pipe-threaded socket 92 at its upper end. Thus, the attenuator 40A can be suspended in a well 10 by attaching a hose line 74 or 80 to the socket 92 by providing a threaded coupling on the lower end of the hose line 74 or 80 which screws into the socket 92. As shown in FIGS. 4 and 6, this attenuator 40A can be suspended below an energy source 20 in a well by extending a section of high pressure hose line 80 down from the energy source 20 and attaching it to the socket 92.

In order firmly to secure the upper end of the tapered bladder 46-1 in place, the exterior surface of the axial tube frame 90 is threaded at 94 immediately below the socket 92, and a pair of clamp rings 96 encircle the upper end portion of the bladder 46-1 overlying this threaded region 94.

In order firmly to secure the lower end of the tapered conical bladder 46-1 and the upper end of the circular cylindrical bladder 46-2, there is a mounting seat member 98 for example, of steel, rigidly attached to the axial tube 90, for example, by welds at 100. The exterior surface of the seat member 98 is threaded in an upper region 94 for receiving the lower end portion of the tapered bladder 46-1 secured by a pair of clamping rings 96 and is also threaded in a lower region 94 for receiving the upper end portion of the cylindrical bladder 46-2 secured by another pair of clamp rings 96. For preventing abrasion of the bladders 46-1 or 46-2 against the well wall, a large O-ring 102 of resilient polymeric material, for example, polyurethane is mounted in a retainer groove 104 between the two bladders 46-1 and 46-2 for serving as a bumper or protective annular shoulder.

During assembly, the lower bladder 46-2 is slid down over the seat member 98, and the O-ring bumper 102 is installed after the lower bladder 46-2 has been installed.

Then, the upper bladder 46-1 is installed after the O-ring bumper 102 is in place.

As seen in FIG. 7B, the axial tube frame 90 extends down a considerable distance below the mounting seat member 98 and is securely attached, for example, by welding 100, to a lower end fixture 106. The lower end of the cylindrical bladder 46-1 is firmly secured to an externally threaded region 94 of the fixture 106 by a pair of clamp rings 96. The bore 108 of the tube frame 90 communicates through a passageway 110 in the fixture 106 with a pressure-reducing and regulating valve 48. This regulating valve 48 is mounted in an axial socket 112 in the fixture 106, being retained by a removable retainer sleeve 114 which is held by a removable end fitting 116 fastened to the fixture 106 by machine screws 118. The pressure-reducing valve 48 is sealed to the passageway 110 by an O-ring 120. The pressurized gas, usually compressed air, of regulated pressure is fed from the valve 48 through a passageway 122 in the fixture 106 communicating with the interior of the bladder 46-2, and an O-ring 124 seals the valve 48 to the passageway 122. As seen in FIG. 7A, the interior of the bladder 46-2 communicates with the interior of the bladder 46-1 through a passageway 126 in the mounting seat member 98. Thus, the valve 48 supplies both bladders with pressurized gas at the desired pressure compared with ambient, for example, about 1 to about 8 p.s.i. above ambient.

In order for the pressure-reducing and regulating valve 48 to sense ambient pressure, there is an axial passage 128 in the end fitting 116. For protecting the valve 48 from dirt and grit, a particle filter 130 is held in the passage 128 by a snap ring 132; this filter 130 comprises a fibrous mat sandwiched between two discs each having numerous apertures.

If the adjustable pressure-reducing and regulating valve 48 is also a self-venting valve set to vent at a pressure above the regulated pressure, for example, set to vent at about 12 p.s.i., then a pressure-relief valve is not needed.

If a pressure-relief valve 50 is included, it is mounted in a transverse socket 134 communicating through a passage 136 with the passage 122 communicating with the interior of the bladders 46-1 and 46-2. The other end of the drilled passage 136 is plugged at 138. The pressure-relief valve 50 is held in its socket 134 by a threaded ring 140 and communicates with ambient liquid through a port 142 in this ring.

It is to be noted that the fixture 106 is enlarged in diameter below the region 94 where the bladder 46-2 is attached, and this enlargement serves as a protective annular shoulder below the lower end of the bladder for preventing abrasion of the bladder 46-2 against the well wall.

In operation, pressurized gas, usually compressed air, supplied into the socket 92 feeds down through the bore 108 of the tubular support 90 and feeds through passage 110 to the pressure-reducing and regulating valve 48. Pressurized gas at the desired pressure level relative to the pressure of ambient liquid is supplied by the valve 48 through the passageway 122 into the interiors of the two bladders. When the attenuator 40A is raised in the well to a region of reduced ambient pressure, the pressure relief valve 50 bleeds away pressurized gas from the passageways 122, 136 through the port 142 to ambient. If the valve 48 is self-venting, then pressurized gas bleeds away from the passageway 122 through the valve 48 through the axial passage 128 and through the filter 130 to ambient.

As used herein, the term "phones" is intended to include geophones and hydrophones.

Regardless of whether the description of the precise nature of tube waves in the introduction is incomplete or inaccurate in some respects, it is fully accurate that the attenuation method, system and apparatus of the present invention are very effective and advantageous in eliminating or dramatically reducing the problems caused by unwanted tube waves occurring in a well when using an impulsive seismic energy (sound) source in a liquid-containing well in the earth for seismic surveying of the structure of the Earth around the well.

In the event that the energy source 20 is a vibrator, and if a vibrator causes tube waves in the liquid-containing well, then the present invention may be used to advantage with such a vibrator energy source.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A method for attenuating unwanted tube waves generated in a liquid column extending lengthwise in a well in the earth as a result of operating an impulsive seismic energy source in the liquid column in the well comprising the steps of:

lowering a gas inflatable resilient attenuator down into a liquid column in a well, said gas inflatable resilient attenuator being elongated in an axial direction and said axial direction being aligned with the lengthwise direction of said liquid column, supplying pressurized gas to said gas inflatable resilient attenuator, regulating the pressurized gas supplied to said gas inflatable resilient attenuator to at least be equal to the ambient pressure in said liquid column adjacent to said attenuator, arranging said elongated resilient attenuator to have an external diameter less than the inside diameter of the well for providing an axially elongated annular clearance between the attenuator and a wall of the well, lowering an impulsive seismic energy source down into said liquid column in said well to an elevation in the well different from the elevation of said gas inflatable resilient attenuator, and firing said impulsive seismic energy source, whereby tube waves traveling along said liquid column in the lengthwise direction thereof from said impulsive energy source to said elongated gas inflatable resilient attenuator are attenuated by said elongated resilient attenuator absorbing and dissipating said tube waves therein and in said axially elongated annular clearance between the elongated resilient attenuator and the well wall prior to reaching an end of the liquid column in said well.

2. The method as claimed in claim 1 including the steps of:

lowering said elongated resilient attenuator to a level in the liquid column in the well below said impulsive seismic energy source, lowering a second elongated gas inflatable resilient attenuator being elongated in an axial direction in said liquid column in the well to a level above said energy source prior to the firing of said energy source, arranging said second elongated resilient attenuator to have an external diameter less than the inside diameter of the well for providing an axially elongated annular clearance between said second attenuator and the well wall, said second elongated gas inflatable resilient attenuator being aligned with the lengthwise direction of said liquid column for absorbing and damping therein and in said axially elongated annular clearances surrounding said elongated gas inflatable resilient attenuators tube waves traveling in said liquid column in the lengthwise direction thereof downwardly and upwardly from said energy source before such tube waves reach either end of said liquid column.

3. The method as claimed in claim 1 including the steps of:

raising said gas inflatable elongated resilient gap attenuator upwardly in the liquid column in the well, and releasing pressurized gas from said elongated inflatable attenuator into said liquid column to prevent the internal pressure of said gas inflatable elongated resilient gap attenuator from exceeding a predetermined differential above ambient pressure of the liquid near said attenuator for preventing damage to the gas inflatable elongated resilient gas attenuator upon being raised from a lower to a higher elevation in said well.

4. The method as claimed in claim 2 including the steps of:

supplying pressurized gas to said first and second elongated inflatable attenuators form a common source of pressurized gas.

5. A system for seismic surveying of the structure of the Earth in which phones are arranged in the vicinity of a well in the Earth containing a column of liquid extending lengthwise in the well, said well having an inside diameter, an impulsive energy source is positioned submerged in said column of liquid in said well for firing said impulsive energy source for transmitting seismic energy waves through the Earth to the phones for gathering data about geologic formations in the Earth surrounding said well, said system comprising:

an elongated gas inflatable resilient attenuator having a longitudinal axis, support means for positioning said gas inflatable resilient attenuator in said column of liquid at a different elevation in said column of liquid from said impulsive energy source and with its longitudinal axis aligned with the lengthwise direction of said column of liquid for attenuating tube waves traveling along said column of liquid from said source to said gas inflatable resilient attenuator, said elongated gas inflatable resilient attenuator having an external diameter slightly less than the inside diameter of the well for defining an axially elongated narrow annular clearance surrounding said elongated gas inflatable resilient attenuator, means for supplying pressurized gas into said elongated inflatable attenuator for inflating said attenuator in said well, and regulating means for regulating the pressurized gas supplied to said gas inflatable resilient attenuator to at least be equal to the ambient pressure in said column of liquid at the elevation of said attenuator, whereby tube waves traveling in the lengthwise direction along said liquid column are attenuated by absorbing and damping by said elongated gas inflatable resilient attenuator in association with said axially elongated narrow annular clearance surrounding said resilient attenuator before the tube waves reach an end of said column of liquid, thereby minimizing the transmission of secondary seismic energy waves from discontinuities within the column of liquid upon reflections of tube waves from said discontinuities.

6. The system as claimed in claim 5 wherein:

said elongated gas inflatable resilient attenuator includes an elongated gas inflatable resilient bladder, and protective means for protecting said bladder having a larger external diameter than said bladder and less than the inside diameter of the well for preventing abrasion of the bladder against a wall surface of the well.

7. The system as claimed in claim 6 wherein:

said elongated gas inflatable resilient attenuator includes pressure-relief means responsive to ambient liquid pressure in said column of liquid at the elevation of said attenuator and responsive to the pressure of the gas within said bladder for automatically releasing pressurized gas from said bladder into the liquid in the well when the differential in pressure between said ambient liquid pressure and the internal pressure in said bladder exceeds a predetermined amount for preventing rupture of said bladder when said elongated inflatable attenuator is being elevated in the column of liquid in said well.

8. The system as claimed in claim 5, wherein:

said gas elongated gas inflatable resilient bladder is tapered and flares outwardly to a larger diameter in a direction away from said energy source.

9. The system as claimed in claim 5, wherein:

said gas inflatable elongated gas attenuator includes a container of pressurized gas associated with said elongated inflatable resilient bladder and which is lowered into said well along with said inflatable bladder for inflating said bladder with pressurized gas, and said regulating means regulates the pressure of the pressurized gas inflating said bladder.

10. The system as claimed in claim 9, wherein:

said container of pressurized gas is positioned within said inflatable bladder.

11. The system as claimed in claim 5 wherein:

said elongated gas inflatable resilient attenuator is positionable in said column of liquid in the well below said impulsive energy source, a second elongated gas inflatable resilient attenuator is positionable in said column of liquid in said well above said impulsive energy source, said second elongated gas inflatable resilient attenuator having a longitudinal axis and being positionable with its longitudinal axis aligned with the lengthwise direction of said column of liquid, and said second elongated gas inflatable resilient attenuator having an external diameter slightly less than the inside diameter of the well for defining an axially elongated narrow annular clearance region surrounding said second elongated inflatable attenuator for absorbing and damping by said attenuators in association with the axially elongated narrow annular clearance surrounding said resilient attenuators tube waves traveling downwardly and upwardly along said column of liquid from said impulsive energy source.

12. The system as claimed in claim 8, wherein:
each of said first and second gas elongated inflatable gas resilient attenuators includes a container of pressurized gas attached thereto for accompanying said first and second inflatable attenuators in said liquid column in the well.

13. The system as claimed in claim 11, wherein:
said first and second elongated gas inflatable resilient attenuators are supplied with pressurized gas from a common source of pressurized gas located on the surface of the Earth at the mouth of the well.

14. Tube-wave attenuation apparatus for use in seismic surveying of the structure of the Earth, wherein phones are arranged in the vicinity of a well in the Earth, said well has a well wall with an inside diameter and contains liquid extending lengthwise in the well forming a column of liquid in the well, and an impulsive energy source is lowered into the column of liquid in said well and is fired in the liquid in the well for transmitting seismic energy waves from said impulsive energy source through the Earth to the phones for gathering data about geologic formations in the Earth surrounding said well, said tube-wave attenuation apparatus comprising:
an axially elongated inflatable resilient attenuator having an interior and connection means communicating with said interior;
said elongated inflatable resilient attenuator having an external diameter less than the inside diameter of a well into which it is to be lowered for defining an axially elongated narrow clearance between said attenuator and the well wall for absorbing and damping tube waves in said resilient attenuator in association with said axially elongated narrow clearance,
said axially elongated inflatable resilient attenuator being positionable in said column of liquid below said impulsive energy source which is also positionable in said column of liquid,
pressurized gas supply means for supplying pressurized gas through said connection means into the interior of said elongated inflatable resilient attenuator,
pressure-regulating means in said connecting means and being responsive to ambient hydrostatic pressure in the column of liquid in said well at the elevation of said attenuator in said column of liquid,
said pressure-regulating means responding to said ambient hydrostatic pressure for regulating the pressurized gas being supplied into the interior of said inflatable attenuator to be at least equal in pressure to said ambient hydrostatic pressure;
protective means for said elongated inflatable resilient attenuator for preventing abrasion with a wall of a well, said protective means having an exterior diameter larger than the external diameter of said elongated inflatable resilient attenuator but less than the inside diameter of a well into which said elongated inflatable resilient attenuator is to be lowered; and
pressure-venting means communicating with the interior of said elongated inflatable resilient attenuator and being responsive to said ambient hydrostatic pressure for releasing pressurized gas from said interior into the ambient liquid upon the pressure within the interior of said attenuator exceeding said ambient hydrostatic pressure by a predetermined difference for preventing bursting of the elongated inflatable resilient attenuator when said tube-wave attenuation apparatus is raised from lower to higher elevations in the column of liquid in the well.

15. The tube-wave attenuation apparatus as claimed in claim 14, wherein said axially elongated inflatable resilient attenuator includes:
an axially elongated inflatable resilient bladder, and
said protective means is a hollow cylindrical member of strong material having numerous apertures therein encircling said bladder in axial alignment concentric with said bladder,
said hollow cylindrical member being spaced radially outwardly from said resilient bladder by a spacing in the range from about $\frac{1}{8}$th to about $\frac{1}{2}$ of an inch, and
said hollow cylindrical member is positionable to be aligned with the lengthwise direction of said liquid column and has an external diameter slightly less than the inside diameter of the well wall for defining an axially elongated narrow annular clearance between said hollow cylindrical member and the well wall for helping in damping tube waves in said axially elongated narrow annular clearance.

16. The tube-wave attenuation apparatus as claimed in claim 15, in which:
a container of pressurized gas is coupled through said pressure-regulating means to the interior of said bladder for maintaining said bladder inflated with pressurized gas to a pressure at least equal to the ambient hydrostatic pressure in said liquid column surrounding said bladder as said attenuator is being lowered in said liquid column in the well.

17. The tube-wave attenuation apparatus as claimed in claim 15, wherein said axially elongated inflatable resilient attenuator includes:
at least one axially elongated inflatable resilient bladder,
said axially elongated inflatable resilient attenuator has an external diameter less than the inside diameter of the well wall,
said axially elongated inflatable attenuator is positionable in said well aligned with the lengthwise direction of said column of liquid for defining an axially elongated narrow annular clearance between said attenuator and the well wall for absorbing and damping tube waves travelling in the lengthwise direction of said column of liquid, and
said protective means has a larger effective diameter than said inflatable bladder but less than the inside diameter of the well for acting as a bumper for preventing said bladder from abrading against a wall of a well.

18. Liquid-containing-well-tube-waves attenuation apparatus for use in seismic surveying of the structure of the Earth, wherein phones are arranged in the vicinity of a well in the Earth, said well containing liquid extending lengthwise of said well forming a liquid column in said well, said well having a wall with an inside diameter, and wherein an impulsive energy source is lowered into the liquid column in said well and is fired in the liquid column in the well for transmitting seismic energy waves from said impulsive energy source through the Earth to the phones for gathering data about geologic formations in the Earth surrounding said well, said liquid-containing-well-tube-waves attenuation apparatus comprising:
- an axially elongated inflatable resilient bladder having an interior and having an exterior size less than the inside diameter of the wall of a well into which said attenuation apparatus is to be lowered;
- protective means for said bladder for preventing said bladder from abrading against said well wall;
- said protective means having an effective diameter larger than said bladder but smaller than said inside diameter of said well wall and being mounted in association with said bladder,
- pressurized gas supply means for supplying pressurized gas into the interior of said bladder;
- pressure-regulating means for responding to ambient hydrostatic pressure in the liquid column in said well at the elevation of said bladder in said liquid column;
- said pressure-regulating means communicating with said gas supply means and with the interior of said bladder for regulating the pressurized gas being supplied into the interior of said bladder to be at least equal in pressure to such ambient hydrostatic pressure;
- said axially elongated resilient bladder and said protective means being adapted to be supported in said liquid column below the impulsive energy source, whose firing initiates tube waves traveling along the liquid column, with said axially elongated resilient bladder extending lengthwise of said well and defining an axially elongated narrow annular clearance region between said bladder and the well wall for absorbing and damping tube waves in said axially elongated narrow annular clearance region; and
- pressure-relief means communicating with the interior of said bladder and being responsive to such ambient hydrostatic pressure for releasing pressurized gas from said interior into the ambient liquid upon the pressure in the interior of said bladder exceeding the ambient hydrostatic pressure by a predetermined difference for preventing bursting of the bladder when said tube-waves attenuation apparatus is raised form lower to higher elevations in the liquid column in the well.

19. Tube-waves attenuation apparatus as claimed in claim 18, wherein:
   said protective means is an apertured cylindrical housing surrounding said inflatable resilient bladder and having multiple apertures in said cylindrical housing; and
   said apertured cylindrical housing has an inner surface spaced radially away from said bladder when said bladder is inflated for defining an annular clearance space around said bladder within said apertured housing.

20. Tube-waves attenuation apparatus as claimed in claim 18, wherein:
   said inflatable resilient bladder is tapered and flares outwardly to a larger diameter in a direction away from said impulsive energy source.

21. Tube-waves attenuation apparatus as claimed in claim 20, wherein:
   said inflatable resilient bladder has an elongated conical configuration.

22. Tube-waves attenuation apparatus as claimed in claim 18, further comprising:
   first and second resilient bladders each having an interior;
   said first bladder having a tapered configuration and flaring outwardly from a smaller effective diameter end portion to a larger effective diameter end portion;
   said second bladder having a generally circular cylindrical configuration with first and second ends and being mounted in axial alignment with said first bladder;
   said first end of said second bladder being mounted near the larger effective diameter end portion of said first bladder;
   said pressurized gas supply means supplying gas into the interiors of both bladders;
   said pressure-regulating means regulating the pressurized gas being supplied into the interiors of both bladders; and
   said pressure-relief means communicating with the interiors of both bladders for releasing pressurized gas from the interiors of both bladders into the ambient liquid upon the pressure in the interiors of said bladders exceeding by a predetermined difference the hydrostatic pressure in the liquid column at the elevation of said pressure-relief means in the liquid column for preventing bursting of either bladder when the tube-wave attenuation apparatus is raised form a lower to a higher elevation in the liquid column in the well.

23. Tube-waves attenuation apparatus as claimed in claim 22, wherein:
   said pressure-regulating means and said pressure-relief means communicate with the interior of said second bladder at said second end of said second bladder; and
   the interior of said second bladder communicates with the interior of said first bladder by an interconnection between the first end of said second bladder and said larger effective diameter end portion of said first bladder.

24. Tube-waves attenuation apparatus as claimed in claim 22, wherein:
   said protective means is mounted in association with said bladders by a support member extending axially through both said first and second bladders.

25. Tube-waves attenuation apparatus as claimed in claim 23, wherein:
   said protective means is mounted in association with said bladders by a support member extending axially through both said first and second bladders.

26. Tube-waves attenuation apparatus as claimed in claim 25, wherein:
   said second bladder is positioned below said first bladder;
   said support member is tubular and has a bore serving as said pressurized gas supply means and has connection means at its upper end for connecting its bore to a source of pressurized gas; and
   the lower end of the bore of said tubular support member communicates with said pressure-regulating means.

27. Liquid-containing-well-tube-waves attenuation apparatus for use in a liquid column in an Earth well for attenuating tube-waves caused by operation of an impulsive seismic energy source in the liquid column, said liquid-containing-well-tube-waves attenuation apparatus comprising:

an axially extending support member having first and second ends;

an elongated generally conically tapered first gas inflatable bladder having an interior and a first end portion and a second end portion;

said first end portion of said first bladder having a smaller diameter than said second end portion;

said smaller diameter first end portion of said first bladder being mounted adjacent to said first end of said axial support member for being supported by said axial support member;

said larger diameter second end portion of said first bladder being mounted adjacent to an intermediate region of said axial support member for being supported by said axial support member;

an elongated generally cylindrical second gas inflatable bladder having an interior and first and second end portions;

said first end portion of said second bladder being mounted adjacent to said intermediate region of said axial support member adjacent to said larger diameter second end portion of said first bladder for being supported by said axial support member;

said second end portion of said second bladder being mounted adjacent to said second end of said axial support member for being supported by said axial support member;

said tube-waves attenuation apparatus being adapted to be mounted at a different elevation in the liquid column from the impulsive seismic energy source with said first end of said support member facing toward the impulsive seismic energy source;

said elongated generally cylindrical second bladder having an exterior diameter smaller than such liquid column for defining an axially elongated narrow annular region in said liquid column surrounding said second bladder;

pressurized gas supply means;

pressure-regulating means communicating with said gas supply means and with the interiors of said first and second bladders and being responsive to ambient hydrostatic pressure of the liquid column in a well at the elevation of said pressure-regulating means in the liquid column for supplying pressurized gas into the interiors of said bladders at a pressure at least equal to said ambient hydrostatic pressure; and pressure-relief means communicating with the interiors of said first and second bladders and with the ambient liquid for releasing pressurized gas from said interiors into the ambient liquid upon the pressure of the pressurized gas in said interiors exceeding by a predetermined difference said ambient hydrostatic pressure for preventing rupture or damage to said first and second bladders upon raising said tube-wave attenuation apparatus from a lower to a higher elevation in the liquid column.

28. Tube-waves attenuation apparatus as claimed in claim 27, in which:

said axial support member is tubular having a bore;

said first end of said axial support member includes connection means for connection to a source of pressurized gas for supplying pressurized gas into said bore; and said bore at said second end of said axial support member communicates with said pressure-regulating means.

29. Tube-waves attenuation apparatus as claimed in claim 27, in which:

protective means having a larger effective diameter than said large diameter second end portion of said first bladder and larger than said first end portion of said second bladder but smaller than such liquid column adjacent to said second end portion of said first bladder and adjacent to said first end portion of said second bladder for preventing abrasion of said bladders against a wall surface of a well.

30. Tube wave attenuation apparatus as claimed in claim 29, in which:

additional protective means having a larger diameter than said second end portion of said second bladder but smaller than such liquid column are mounted near said second end portion for preventing abrasion of said second bladder against a wall surface of a well.

31. Tube-waves attenuation apparatus as claimed in claim 27, in which:

said pressure-regulating means supplies pressurized gas into the interiors of said bladders at a pressure in the range from about 1 pounds per square inch to about 8 pounds per square inch above ambient liquid pressure.

* * * * *